United States Patent
Paik et al.

(10) Patent No.: US 11,606,316 B2
(45) Date of Patent: Mar. 14, 2023

(54) SYSTEM AND METHOD FOR MODEM STABILIZATION WHEN WAITING FOR AP-DRIVEN LINK RECOVERY

(71) Applicant: QUALCOMM INCORPORATED, San Diego, CA (US)

(72) Inventors: Hyun Seung Paik, San Jose (CA); Alok Mitra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 17/100,579

(22) Filed: Nov. 20, 2020

(65) Prior Publication Data
US 2022/0166729 A1    May 26, 2022

(51) Int. Cl.
| | |
|---|---|
| H04L 49/90 | (2022.01) |
| G06F 1/3287 | (2019.01) |
| G06F 12/1081 | (2016.01) |
| G06F 13/42 | (2006.01) |
| H04L 47/32 | (2022.01) |

(52) U.S. Cl.
CPC ............ *H04L 49/90* (2013.01); *G06F 1/3287* (2013.01); *G06F 12/1081* (2013.01); *G06F 13/4282* (2013.01); *G06F 2213/0026* (2013.01); *H04L 47/32* (2013.01)

(58) Field of Classification Search
CPC ..... H04L 47/32; H04L 49/90; H04L 49/9063; H04L 49/9084; G06F 1/3209; G06F 1/3278; G06F 1/3287; G06F 12/1081; G06F 13/1642; G06F 13/1673; G06F 13/4282; G06F 2213/0026; Y02D 10/00
See application file for complete search history.

(56) References Cited

U.S. PATENT DOCUMENTS

| | | | | |
|---|---|---|---|---|
| 5,708,779 | A | * 1/1998 | Graziano | .............. H04L 49/901 710/24 |
| 2003/0076804 | A1 | * 4/2003 | Sivalingham | ........... H04L 67/56 370/353 |
| 2004/0218617 | A1 | * 11/2004 | Sagfors | ................. H04L 47/193 370/229 |

(Continued)

FOREIGN PATENT DOCUMENTS

WO    03-036883 A1    5/2003

OTHER PUBLICATIONS

Q. Zhu et al. "Improving QoE for Skype Video Call in Mobile Broadband Network", Global Communications Conference (Globecom), 2012 IEEE, Dec. 2012, pp. 1938-1943. (Year: 2012).*

(Continued)

*Primary Examiner* — Shah M Rahman
(74) *Attorney, Agent, or Firm* — Smith Tempel Blaha LLC/Qualcomm

(57) ABSTRACT

Various embodiments of methods and systems for a modem-directed application processor boot flow in a portable computing device ("PCD") are disclosed. An exemplary method includes an application processor that transitions into an idle state, such as a WFI state, for durations of time during a boot sequence that coincide with processing by a DMA engine and/or crypto engine. That is, the application processor may "sleep" while the DMA engine and/or crypto engine process workloads in response to instructions they received from the application processor.

18 Claims, 10 Drawing Sheets

(56) References Cited

U.S. PATENT DOCUMENTS

| | | | | |
|---|---|---|---|---|
| 2008/0063004 A1* | 3/2008 | Himberger | .............. | H04L 47/12 370/413 |
| 2013/0346801 A1* | 12/2013 | Freking | .................. | G06F 13/00 714/E11.178 |
| 2014/0207991 A1* | 7/2014 | Kaushik | .............. | G06F 13/4282 455/418 |
| 2014/0269471 A1* | 9/2014 | Wagh | .................... | G06F 1/3278 370/311 |
| 2014/0281753 A1* | 9/2014 | Wagh | .................. | G06F 11/0745 714/56 |
| 2015/0378953 A1* | 12/2015 | Debbage | ............... | G06F 13/372 710/117 |
| 2016/0103689 A1* | 4/2016 | Sanghi | ................ | G06F 11/1471 710/313 |
| 2017/0168966 A1* | 6/2017 | Mishra | ................... | G06F 13/364 |
| 2017/0215145 A1* | 7/2017 | Solotke | ............. | H04W 52/0235 |
| 2017/0262395 A1* | 9/2017 | Thanigasalam | ..... | G06F 13/4282 |
| 2017/0353586 A1* | 12/2017 | Leucht-Roth | ........... | H04L 69/22 |
| 2018/0004273 A1* | 1/2018 | Leucht-Roth | ......... | G06F 1/3209 |
| 2019/0179784 A1* | 6/2019 | Tsuji | ....................... | G06F 13/36 |
| 2019/0251056 A1* | 8/2019 | Klacar | ................ | G06F 13/4295 |
| 2019/0391938 A1* | 12/2019 | Lee | .......................... | G06F 13/24 |
| 2020/0153593 A1* | 5/2020 | Benjamini | ............ | H04L 47/323 |
| 2020/0192455 A1* | 6/2020 | Kumar | .................. | G06F 1/3253 |
| 2020/0334184 A1* | 10/2020 | Suresh | .................. | G06F 13/128 |
| 2020/0409721 A1* | 12/2020 | Gorecha | ............... | G06F 9/4401 |
| 2020/0412655 A1* | 12/2020 | Thyagaturu | ........... | H04L 43/028 |
| 2021/0042128 A1* | 2/2021 | Ishida | ..................... | G06F 13/36 |
| 2021/0409335 A1* | 12/2021 | Zhu | ......................... | H04L 47/24 |

OTHER PUBLICATIONS

Related PCT Patent Application: International Search Report and Written Opinion—PCT/US2021/054433—ISA/EPO—dated Feb. 2, 2022.

\* cited by examiner

SYSTEM AND METHOD FOR MODEM STABILIZATION WHEN WAITING FOR AP-DRIVEN LINK RECOVERY

DESCRIPTION OF THE RELATED ART

Portable computing devices ("PCDs") are becoming necessities for people on personal and professional levels. These devices may include cellular telephones, portable digital assistants ("PDAs"), portable game consoles, palm-top computers, and other portable electronic devices.

PCDs commonly include an application processor ("AP") that is comprised within a complex system termed a mobile chipset or system on a chip ("SoC"). The AP is generally the overall supervisor of the functions delivered by the SoC and, as such, is often in the role of a "master" processor directing the activities of other "slave" processors that are dedicated to delivering specific functionalities. For example, the modem processor of a SoC is usually designated as a slave processor to the AP.

On many SoCs, the modem operates according to a peripheral component interconnect express ("PCIe") protocol. The PCIe protocol not only dictates what a modem should do, but also when the modem is allowed to do it. The PCIe protocol is a low-level standard for SoC components and is the protocol used by end-point components (such as a modem) to communicate over a high data rate, PCIe bus with master processors (such as an AP), as would be understood by one of ordinary skill in the art.

By contrast, an AP generally functions according to a Modem-Host Interface ("MHI") protocol that is "on top of" the PCIe standard. That is, the MHI protocol is a master protocol that dictates actions of the AP including its transitions in and out of sleep states (I.e., its modes) as well as end-point sleep states. The PCIe root complex runs on the master AP and is used by the AP to manage PCIe channel links available to end-point components, packet handling between modules, etc. In this way, an end-point component such as a modem relies on the AP to tell it when it can make use of a PCIe channel link for data packet transfer ("DMA") and when it should enter a low-power consumption sleep state.

As would be understood by one of ordinary skill in the art, according to PCIe protocol, establishing a PCIe channel link between a master AP and a slave modem is triggered by action from the AP that transitions the AP into, or out of, a sleep state (such as a D3 hot state or a D3 cold state). The PCIe protocol won't allow the modem to establish a communications link with the AP unless and until the AP makes a state transition. And so, if an overflow of downlink data packets is queued for processing by a modem, and the master AP is taking no action to transition from its own MHI state, then the modem will not be allowed to establish a PCIe communications link with the AP for processing the workload. The modem stays in its own low-power state. From there, the overflow of unprocessed data packets may overwhelm the limited amount of memory available to the modem, resulting in an undesirable modem crash.

Accordingly, what is needed in the art is a method and system for addressing the scenario explained above and avoiding a modem crash. More specifically, what is needed in the art is a system and method for stabilizing an end-point modem while it awaits an AP-driven PCIe link reestablishment.

SUMMARY OF THE DISCLOSURE

Various embodiments of methods and systems for a modem stabilization in a SoC of a portable computing device ("PCD") when waiting for an application processor ("AP") to reestablish a PCIe communications link are disclosed. An exemplary method includes determining that the AP is in a sleep state. The AP and a modem are operable to communicate over a PCIe channel, however it is determined that no active link is available over the PCIe channel. A data packet is recognized as being available in a workload queue for processing by the modem. The modem determines an available queue capacity in a memory component associated with the modem and, if the available queue capacity is adequate to store the data packet, stores the data packet in the available queue capacity for later processing; however, if the available queue capacity is inadequate to store the data packet, drops the data packet from the workload queue. The SoC may be transitioned to a low-power state after dropping the data packet from the workload queue.

The exemplary method may further include monitoring a PCIe link recovery timer such that even if the available queue capacity is adequate to store the data packet, the data packet is dropped from the workload queue if the timer has exceeded a predefined threshold or the data packet is stored in the available queue capacity for later processing if the timer has not exceeded the predefined threshold. Additionally, if the available queue capacity is inadequate to store the data packet, the exemplary method may drive one of a WAKE #signal as PCIe specification defined or a GPIO toggle from the modem to the AP before dropping the data packet from the workload queue. If the wakeup signal (i.e, WAKE #) or GPIO toggle causes reestablishment of a link over the PCIe channel, however, the modem may be transitioned to an active processing state in order to process the data packet. The method may drive either multiple WAKE #signals or multiple GPIO toggles from the modem to the AP before dropping the data packet from the workload queue in the event that no PCIe link is reestablished.

Additionally, if the available queue capacity is adequate to store the data packet, and the timer has exceeded the predefined threshold, the method may drive one of a WAKE #signal or a GPIO toggle from the modem to the AP before the data packet is dropped from the workload queue. And, if the WAKE #signal or the GPIO toggle causes reestablishment of a link over the PCIe channel, the method may transition the modem to an active processing state and process the data packet.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
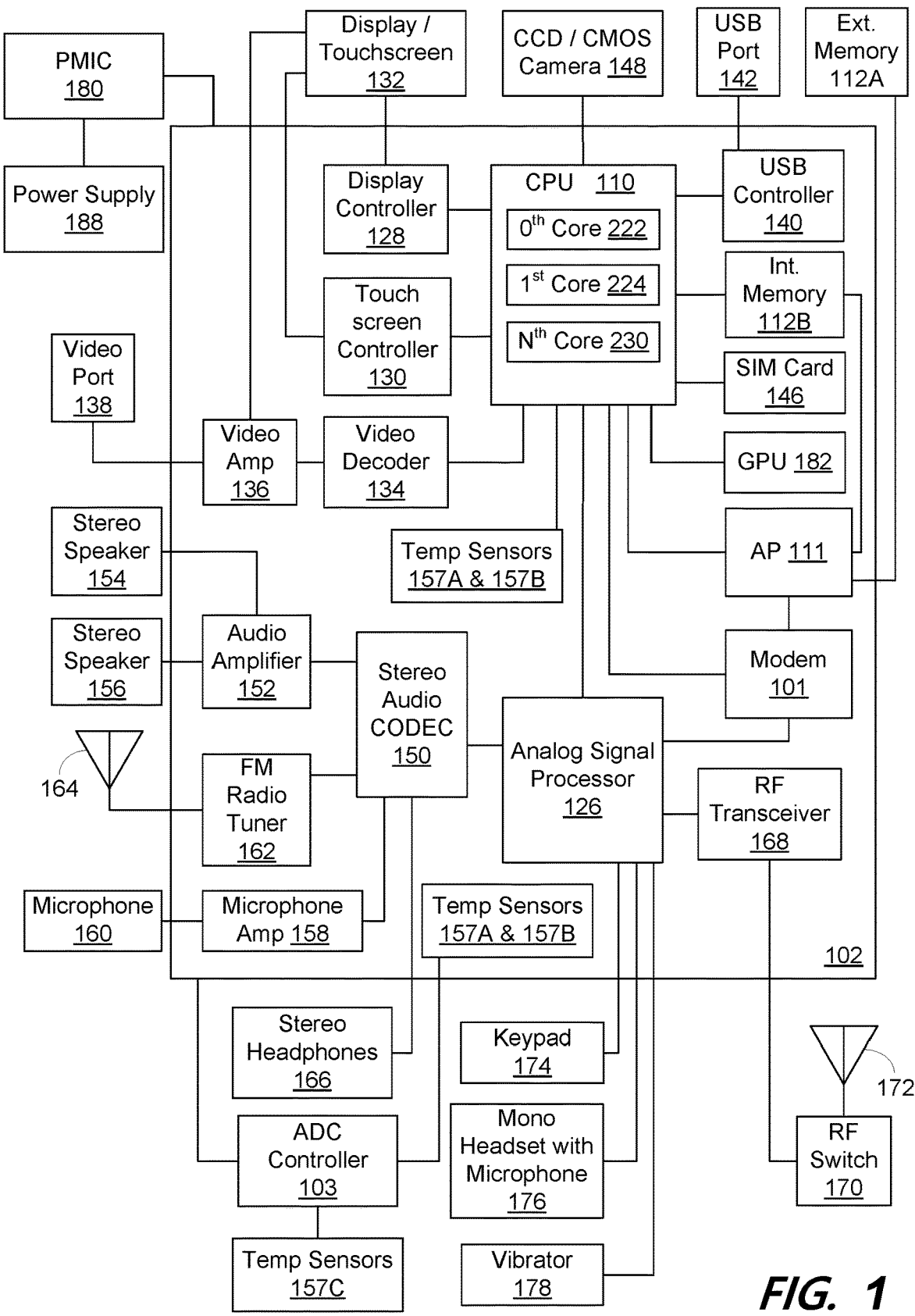
FIG. 1 is a functional block diagram of an exemplary, non-limiting aspect of a PCD in the form of a wireless telephone for implementing methods and systems for modem stabilization when waiting for an AP-driven PCIe link recovery.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "processing component," "processing engine," "modem," "application processor" and the like are intended to refer to a computer-related entity, either hardware, firmware, a combination of hardware and software, software, or software in execution and represent exemplary means for providing the functionality and performing the certain steps in the processes or process flows described in this specification. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "application processor ("AP")," "chip" and "chipset" are non-limiting examples of processing components that may reside in a PCD and are used interchangeably except when otherwise indicated. Moreover, as distinguished in this description, a CPU, DSP, AP or a chip or chipset may be comprised of one or more distinct processing components generally referred to herein as "core(s)."

In this description, reference to "external memory device" and the like refers to a broader class of non-volatile (i.e., retains its data after power is removed) programmable memory and will not limit the scope of the solutions disclosed. As such, it will be understood that use of the terms envisions any programmable read-only memory or field programmable non-volatile memory suitable for a given application of a solution such as, but not limited to, embedded multimedia card ("eMMC") memory, EEPROM, flash memory, etc.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") and fifth generation ("5G") wireless technology have enabled numerous PCDs with multiple capabilities. Therefore, a PCD may be a cellular telephone, a satellite telephone, a pager, a PDA, a smartphone, a navigation device, a tablet, a smartbook or reader, a media player, a combination of the aforementioned devices, a laptop computer with a wireless connection, among others.

In this description, the term "DMA engine" refers to a direct memory access component of the SoC that allows certain hardware or subsystems, such as a modem for example, to access system and/or peripheral memory independently from the central processing unit or application processor.

In this description, the term "GPIO" refers to a general purpose input/output communication or signal and/or the physical connection within a SoC designated for handling GPIO communications. A GPIO connection is a type of pin commonly available on an integrated circuit without a designated function. While most pins on a SoC have a dedicated purpose, such as sending a signal to a certain component, the function of a GPIO pin is customizable and can be controlled by software. Embodiments of the solution may leverage a GPIO connection to communicate between a slave modem and a master AP in certain scenarios.

For convenience of describing the exemplary embodiments of the solution, this description refers to "D3hot" and "D3cold" low-power states which are substates of a D3 power state, although embodiments of the solution may be applicable in scenarios that include other low power states such as, but not limited to, D1 and/or D2 low-power states. D0 is understood in the art to be an active processing state.

As one of ordinary skill in the art would recognize, processors may transition between various power states in response to workload demands, thermal energy generation/dissipation levels and power consumption goals. D3 is generally understood in the art to be the lowest-powered device low-power state. The D3 state is commonly subcategorized into two separate and distinct substates, D3hot and D3cold. A slave processor is in the D3hot substate if the slave processor is in the D3 state and the system is in the active S0 system power state. In D3hot, the processor is connected to a power source (although the processor might be configured to draw low current), and the presence of the processor on the PCIe bus can be detected. By contrast, a processor may be in the D3cold substate if the processor is in the D3 state and the system is in a low-power state (a state other than S0). In the D3cold substate, the processor might receive a trickle current, but the processor and the system are effectively turned off until a wake event occurs.

A processor can enter D3hot directly from the D0 state. The transition from D0 to D3hot is made under software control by a driver, as would be understood in the art. A modem in D3hot may be detected on the PCIe bus that it connects to. The bus must remain in the D0 state while the modem is in the D3hot substate. From D3hot, the modem can either return to D0 or enter D3cold. D3cold can be entered only from D3hot.

In D3cold, the modem may be physically connected to the PCIe bus but the presence of the modem on the bus cannot be detected (that is, until the modem is turned on again). In D3cold, either the PCIe bus that the modem connects to is in a low-power state and/or the modem is in a low-power state that doesn't allow it to respond when the PCIe bus driver tries to detect its presence.

The transition from D3hot to D3cold by a modem may occur with no driver interaction. Instead, the driver may indicate whether it is prepared for a D3cold transition before it initiates the transition from D0 to D3hot. Subsequently, a transition from D3hot to D3cold may or may not occur, depending on whether all of the conditions are right to enable the transition.

When a modem enters D3cold, the AP may cause the power source (I.e., the modem PMIC) to turn off. A modem that is transitioned into D3cold transitions out only by entering D0. There is no direct transition from D3cold to D3hot. In the D3cold substate, a processor may be able to trigger a wake signal to wake a sleeping AP.

In this description, the term PCIe is a reference to peripheral component interconnect express. PCIe is a serial I/O interconnect between components on a board, such as between a master application processor ("AP") and an end-point, slave modem ("MDM"). PCIe connections are often used for memory mapping transactions and interrupts. The PCIe bus is multi-lane, with each lane having a pair of connections (one for incoming communications traffic and one for outgoing communications traffic). Notably, PCIe is also an interface standard or protocol for connecting high-speed components over a PCIe interconnect. Accordingly, use of the term "PCIe" in this description may refer to both the physical interconnect between a master AP and a slave modem and the protocol by which use of the interconnect is governed.

In this description, the term "MHI" is a reference to a Modem-Host Interface. MHI is a protocol commonly used by host processors, such as an AP, to control and communicate with modem devices over high speed peripheral buses or shared memory, such as PCIe. Even though MHI can be easily adapted to any peripheral buses, it is primarily used with PCIe based devices. MHI provides logical channels over the physical buses and allows transporting the modem protocols, such as IP data packets, modem control messages, and diagnostics over at least one of those logical channels. Also, the MHI protocol provides data acknowledgment features and manages the power state of the slave modems via one or more logical channels.

In this description, the term "root complex" references a component that connects modem and its memory subsystem to a PCIe switch fabric composed of one or more switch devices. The root complex is executed by the AP.

In certain application scenarios, a modem processor ("MDM") may be unable to exit a D3cold state, and unable to move out of M3 while waiting for D3 hot/cold state, to process incoming data packets when an application processor ("AP") is "stuck" in its own low power state. As described above, the PCIe protocol may prevent the MDM from transitioning out of D3cold unless or until the AP transitions out of its own state of inactivity. In such situations, the MDM may be in danger of crashing and adversely affecting user experience. As will become clearer from a review of the figures and the associated detailed descriptions below, novel methods may be employed to stabilize the modem and avoid such a crash without violating the MHI/PCIe protocol hierarchy.

Beginning now with FIG. 1, illustrated is a functional block diagram of an exemplary, non-limiting aspect of a PCD in the form of a wireless telephone for implementing methods and systems for modem stabilization when waiting for an AP-driven PCIe link recovery. As shown, the PCD 100 includes an on-chip system 102 that includes a heterogeneous, multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art. Moreover, as is understood in the art of heterogeneous multi-core processors, each of the cores 222, 224, 230 may process workloads at different maximum voltage frequencies, exhibit different quiescent supply current ("IDDq") leakage rates at given temperatures and operating states, have different latencies for transitioning from a given idle operating state to an active state, etc. The CPU 110 communicates with multiple operational sensors (e.g., temperature sensors 157) and components distributed throughout the on-chip system 102 of the PCD 100, such as with the modem 101.

In general, the modem 101 may be responsible for monitoring page and/or other downlink data requests requiring action and working with the application processor ("AP") 111 and its DRAM 112B via a PCIe communications link to process the requests. The AP 111 may be a heterogeneous, multi-core processor. In some embodiments, the AP 111 may receive GPIO signals from the modem 101.

As illustrated in FIG. 1, a display controller 128 and a touch screen controller 130 are coupled to the CPU 110. A touch screen display 132 external to the on-chip system 102 is coupled to the display controller 128 and the touch screen controller 130. PCD 100 may further include a video decoder 134, e.g., a phase-alternating line ("PAL") decoder, a sequential couleur avec memoire ("SECAM") decoder, a national television system(s) committee ("NTSC") decoder or any other type of video decoder 134. The video decoder 134 is coupled to the multi-core central processing unit ("CPU") 110. A video amplifier 136 is coupled to the video decoder 134 and the touch screen display 132. A video port 138 is coupled to the video amplifier 136. As depicted in FIG. 1, a universal serial bus ("USB") controller 140 is coupled to the CPU 110. Also, a USB port 142 is coupled to the USB controller 140. A memory 112 (on-chip DRAM 112B associated with AP 111 and off-chip Flash and/or DRAM 112A associated with MDM 101) and a subscriber identity module (SIM) card 146 may also be coupled to the CPU 110 and/or AP 111. Further, as shown in FIG. 1, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 188, for example a battery, is coupled to the on-chip system 102 via a power management integrated circuit ("PMIC") 180. Multiple instances of PMIC 180 may be dedicated to a given component(s) of the SoC such as PMIC 180A for the modem 101 and PMIC 180B for the AP 111. In a particular aspect, the power supply 188 includes a rechargeable DC battery or a DC power supply that is derived from an alternating current ("AC") to DC transformer that is connected to an AC power source.

The CPU 110 may also be coupled to one or more internal, on-chip temperature sensors 157A and 157B as well as one or more external, off-chip temperature sensors 157C. The on-chip temperature sensors 157A, 157B may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors. The temperature sensors 157 may produce a voltage drop that is converted to digital signals with an analog-to-digital converter ("ADC") controller 103. However, other types of temperature sensors 157 may be employed without departing from the scope of the invention.

The temperature sensors 157, in addition to being controlled and monitored by an ADC controller 103, may also be controlled and monitored by one or more modem 101 and/or monitor module(s). The modem 101 and/or monitor module(s) may comprise software which is executed by the CPU 110. However, the modem 101 and/or monitor module(s) may also be formed from hardware and/or firmware without departing from the scope of the invention.

Returning to FIG. 1, any one or more of the touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157C, PMIC 180, Flash 112A, the power supply 188 and the ADC controller 103 are external to the on-chip system 102. However, it should be understood that the modem 101 and AP 111 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112. The processors 110, 111, 126, the modem 101, and the DMA engine (not shown in FIG. 1), the memory controllers and associated memory 112, the instructions stored therein, or a combination thereof may serve as a means for performing one or more of the method steps described herein.

Figure 2:
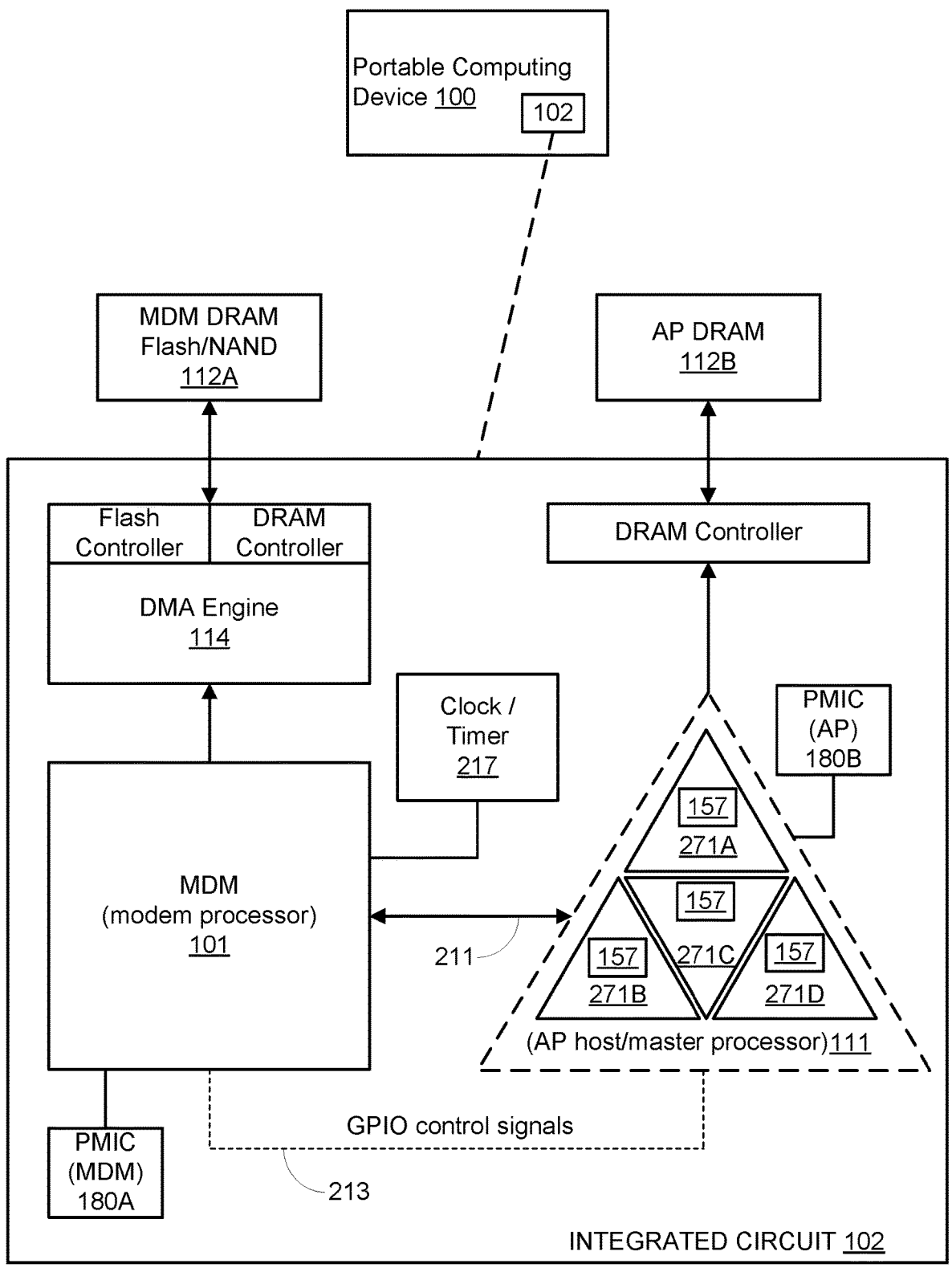
FIG. 2 is a functional block diagram illustrating an embodiment of an on-chip system for executing methods of modem stabilization when waiting for an AP-driven PCIe link reestablishment or recovery.

FIG. 2 is a functional block diagram illustrating an embodiment of an on-chip system for executing methods of modem stabilization when waiting for an AP-driven PCIe link reestablishment or recovery. As can be seen in the FIG. 2 illustration, a modem 101 is in communication with a multi-core 271 application processor 111. The AP 111 shown in the illustration includes four cores 271A, 271B, 271C, 271D, however, it will be understood that an AP 111 is not limited to any specific number of cores 271. Each core may have associated with it a temperature sensor 157 for monitoring thermal energy generation by the respective core and for triggering MHI state changes to manage thermal energy generation, power consumption, etc.

The modem 101 may be in communication with flash/DRAM controller and its associated DMA engine. The controllers control and manage access to data images stored in external memory (e.g., a boot image), such as Flash/NAND memory or MDM DRAM 112A. The modem 101 may also include internal memory registers, as would be understood by one of ordinary skill in the art. Further, the AP 111 may also be in communication with a DRAM memory 112B, by and through a DRAM controller, as would be understood by one of ordinary skill in the art. The DRAM 112B may contain an executing image, as would be understood by one of ordinary skill in the art. The on-chip system 102 may include a clock component 217.

The modem 101 may communicate with the AP 111 via a PCIe bus 211 and according to a PCIe protocol. Depending on embodiment, the modem 101 may also send and receive control signals to/from the AP 111 via a GPIO connection 213. As would be understood by one of ordinary skill in the art, the modem 101 may receive data requests and, via the PCIe link 211, work with the AP 111 and AP DRAM 112B to process the data requests. The MDM's local memory may be fairly limited in size and capacity for queuing incoming data requests. As will become better understood from subsequent figures and their related description, the SoC system 102 illustrated in FIG. 2 may be configured and operable to execute methods to stabilize the modem 101 when it cannot process incoming data requests due to an unavailable or delayed reestablishment of an AP-driven PCIe link.

Figure 3:
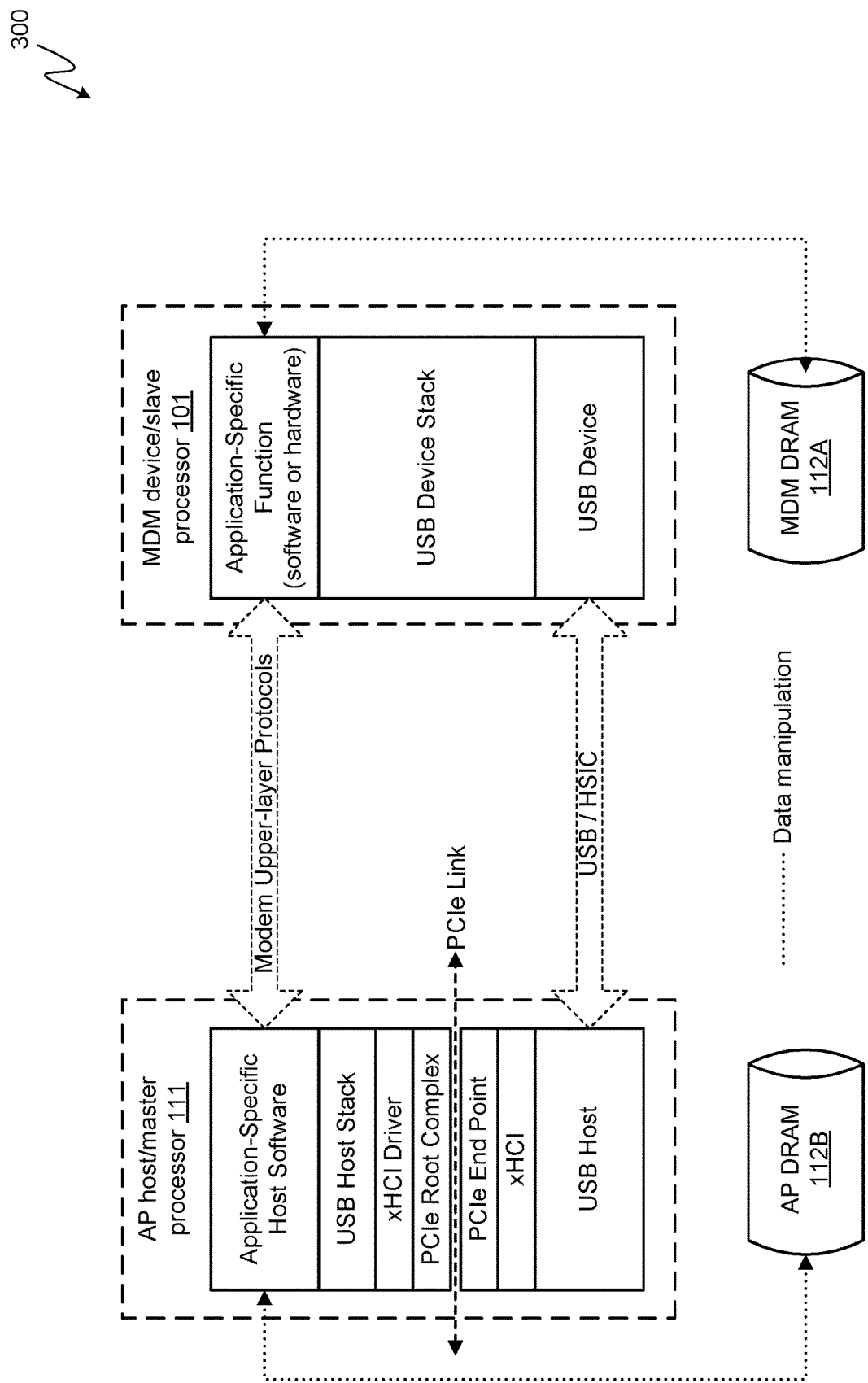
FIG. 3 is a functional block diagram demonstrating the relative level of an exemplary PCIe interface within a protocol stack that may be utilized by the AP and MDM of the on-chip system illustrated in FIG. 2.

FIG. 3 is a functional block diagram 300 demonstrating the relative level of an exemplary PCIe interface 211 within a protocol stack that may be utilized by the AP 111 and MDM 101 of the on-chip system 102 illustrated in FIG. 2. As previously suggested, the AP 111 may load a boot image from its AP RAM 112B and transfer it to the MDM modem 101 which may store it in its device memory for execution. The boot image transfer between the AP 111 and modem 101 may be performed between a USB host (at the AP 111) and a USB device which provide a low-level transport mechanism on which higher level software may effectuate the boot image transfer using the device's upper-layer protocols. Also shown are a controller interface (HCI) layer within the AP stack for the universal serial bus (USB) interface. The modem upper layer protocols may govern the transfer of messages and packets over logical channels.

PCIe devices with a CPU, such as modem 101, that require an executable software image can store their software images onboard in either a boot ROM chip or in persistent file storage mechanism (e.g., NAND/NOR flash 112A). Both of these alternatives may be cost and time inefficient. An alternate scheme is to have the device driver on the AP 111 memory map the device RAM and copy the software images directly into device RAM. This approach requires application processor involvement and may result in sub-optimal AP CPU throughput.

FIG. 3 also depicts the relative level of a PCIe interface 211 within the protocol stack. As would be understood by one of ordinary skill in the art, PCIe does not provide all of the low-level support provided by USB. USB supports messages and packets transfer over serial links and end points. However, one advantage of PCIe is that it can provide faster throughput than USB and is scalable as the system architecture expands. Consequently, in certain circumstances, it may be desirable to implement a PCIe interface 211 between the host processor 111 and MDM 101 while avoiding the USB interface.

Figure 4:
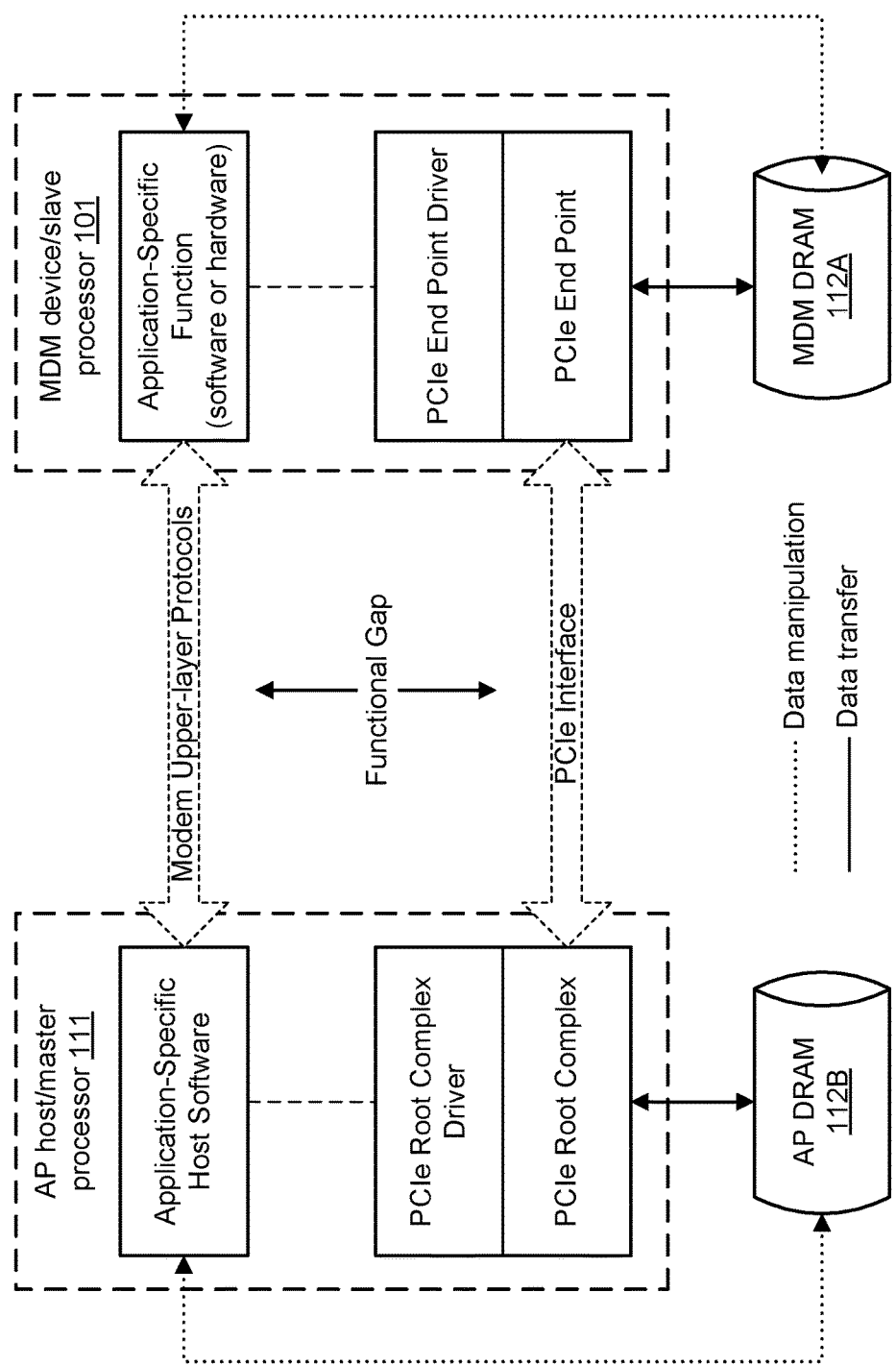
FIG. 4 is a functional block diagram illustrating a functional gap in the protocol stack of FIG. 3.

FIG. 4 is a functional block diagram 400 illustrating a functional gap in the protocol stack of FIG. 3. FIG. 4 illustrates a computing device, such as on-chip system 102, that uses a PCIe interface 211 as a memory-mapped communication path between a host processor, such as AP 111, and a modem 101. As shown, there is a functional gap between the low-level PCIe interface 211 and upper layer protocols. For example, the standard PCIe interface 211 may fail to provide sufficient support to implement data transfer from the AP 111 to the modem 101 without significant involvement from a core of the AP 111.

Figure 5:
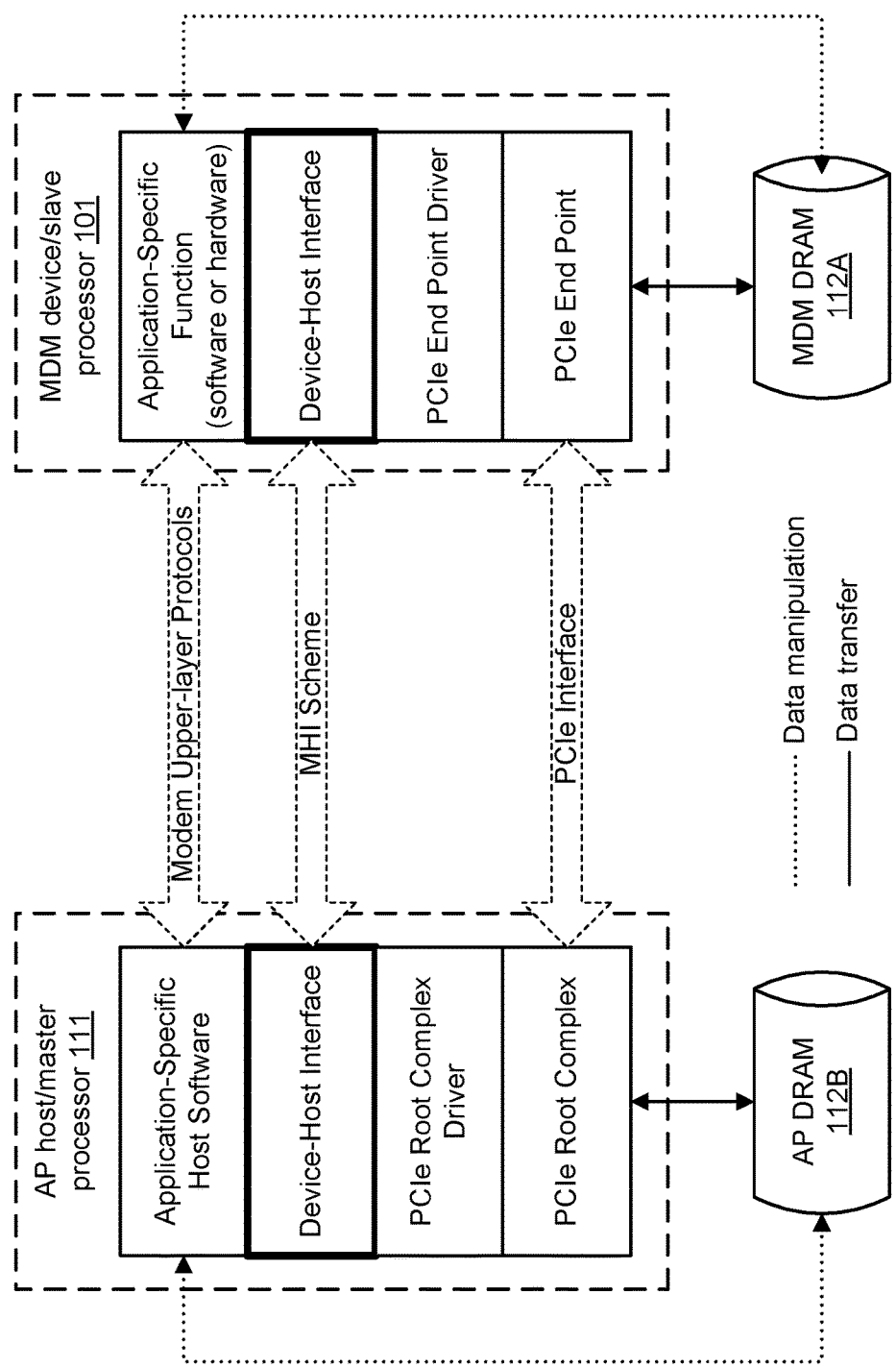
FIG. 5 is a functional block diagram illustrating a modem-host interface ("MHI") deployed within the functional gap illustrated in FIG. 4.

FIG. 5 is a functional block diagram 500 illustrating a modem-host interface ("MHI") deployed within the functional gap illustrated in FIG. 4. In general, the modem-host interface provides logical channels over a memory-mapped communication path such as a PCIe link. The logical channels enable transport of upper layer cellular modem communication protocols (e.g., 2G, 3G, 4G, 5G and LTE protocols) from the modem 101 to the host AP 111. Moreover, commands may be issued between the host AP 111 and the cellular-communication modem (MDM) 101 and a power state may also be communicated and managed via one or more of the logical channels. In addition, the modem-host interface functions to offload the task of downloading software executable images to a PCIe device, such as modem 101. The modem 101 may accomplish software image download via a hardware-accelerated mechanism (e.g., an enhanced direct memory access (DMA) Engine 114) using data buffers allocated in the RAM 112. That is, a shared memory space may be used to transfer the boot image between the host AP 111 and MDM modem 101.

Figure 6:
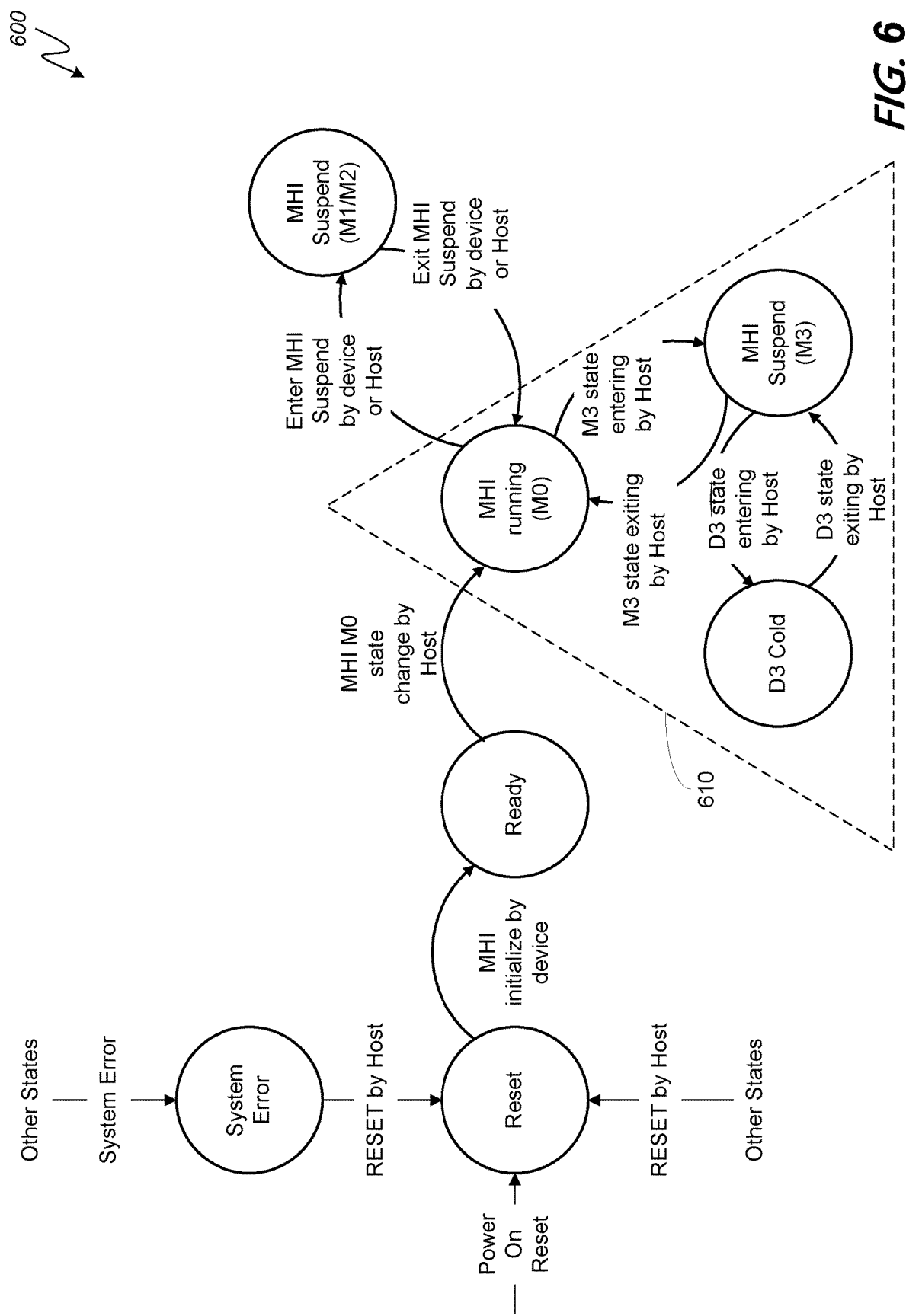
FIG. 6 is an MHI power state machine diagram identifying the state scenario in which embodiments of the solution for modem stabilization when waiting for an AP-driven PCIe link recovery may be employed.

A communication link (e.g., PCIe 211) device driver enumerates the MDM 101 and allocates direct memory access data buffers in the AP RAM 112B. The location (address) of the DMA buffer list may be communicated to the modem 101 via memory mapped configuration registers, as would be understood by one of ordinary skill in the art. Moreover, a doorbell located in application logic of the modem 101 may be leveraged by the host AP 111 to trigger the processing of new transactions by the modem 101 (reference back to this particular operational scenario will be made in regards to the FIG. 6 illustration). Upon completion, the modem 101 triggers an interrupt (e.g., PCIe interrupt) towards the host AP 111 for further processing.

In operation, upon reset/power-up, the modem 101 executes its primary boot loader (PBL) from the hardware boot ROM (small read-only on-chip memory). The PBL then downloads executable code from the AP RAM 112B into the MDM RAM 112A over a memory-mapped communication path 211 (e.g., PCIe) via a hardware accelerated DMA mechanism using the data buffers programmed by the AP 111 in the configuration registers. The DMA engine 114 communicates read/write completion via events/interrupts back to the AP 111. DMA buffer recycling may be handled by the host AP 111 upon receipt of the read/write completion events. Once the MDM 101 executable image is downloaded into the MDM RAM 112A and authenticated, the MDM boot ROM code jumps into that image and starts executing the main MDM boot program from RAM. Similarly for RAM dumps, the MDM 101 uploads RAM dump regions from MDM RAM 112A into the host AP RAM 112B using a similar hardware accelerated mechanism. In one exemplary implementation, the modem-host protocol (flashless boot over high-speed inter-chip HSIC) may be implemented using the proposed hardware accelerated mechanism as a transport medium. In the case where the MDM 101 is realized by a modem chip, the application logic may be a modem subsystem or a packet processing component.

FIG. 6 is an MHI power state machine diagram 600 identifying the state scenario 610 in which embodiments of the solution for modem stabilization when waiting for an AP-driven PCIe link recovery may be employed. Briefly referring back to the FIG. 5 description, a doorbell located in application logic of the modem 101 may be leveraged by the host AP 111 to trigger the processing of new transactions by the modem 101. Upon completion, the modem 101 triggers a PCIe interrupt towards the host AP 111 for further processing. Notably, however, a problem may arise in the state scenario 610 when the host AP 111 is unavailable to change its state and provide the modem 101 with a PCIe link to process the new transactions. In such a scenario, the modem 101 may be "stuck" in a D3cold state and unable to transition back to the running state shown in 610 as it waits on the AP 111 to reestablish a PCIe link. Meanwhile, data packets associated with new transactions may continue to queue up in the limited memory associated with modem 101 (the modem 101 won't process the transactions without being triggered by the AP 111, as required per the PCIe protocol). An overflow of data packets may result in an undesirable crash of modem 101, thereby generating a poor user experience. Advantageously, embodiments of the solution work to address such a situation within state scenario 610 without violating PCIe protocol.

Figure 7:
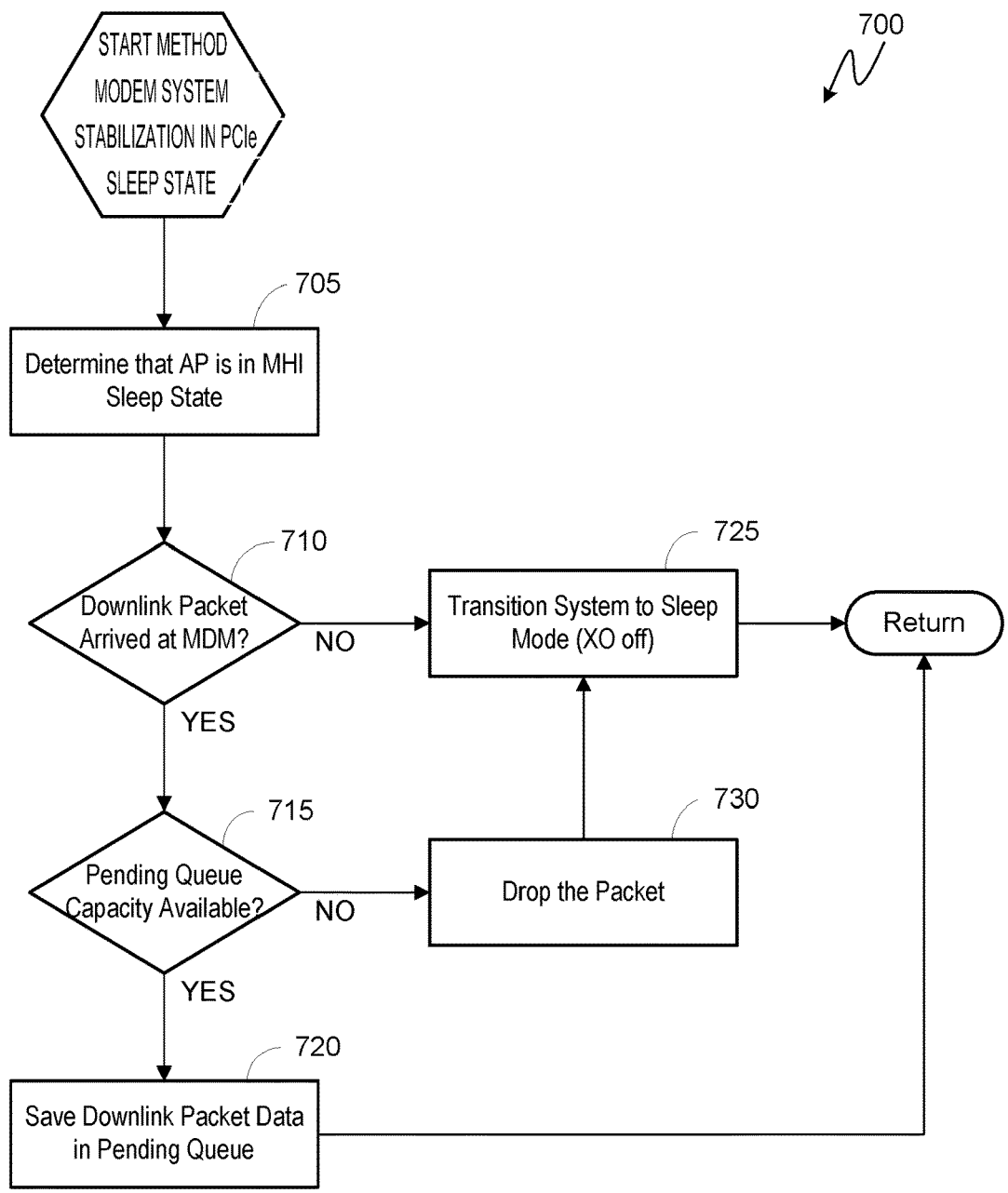
FIG. 7 is a flowchart illustrating a first exemplary method for modem stabilization in a SoC when waiting for an AP-driven PCIe communications link reestablishment.

FIG. 7 is a flowchart illustrating a first exemplary method 700 for modem stabilization in a SoC when waiting for an AP-driven PCIe communications link reestablishment. Beginning at block 705, the method 700 may determine that the AP 111 is in an MHI sleep state. The modem 101 may also be in a sleep state, such as a D3cold state. In such a situation, as previously described, data packets may be arriving at the modem 101 for processing, however, the modem 101 may not be available for processing unless and until the AP 111 transitions out of its present state and establishes (or, more likely, reestablishes) a PCIe communications link with modem 101. With a PCIe communications link 211 established, the modem 101 may transition out of the D3 state and into a D0 state for processing the workloads, per the PCIe protocol.

The method 700 continues to decision block 710. At decision block 710, the method 700 may determine whether a downlink data packet has arrived at modem 101 for processing. If no downlink data packet has arrived, the "no" branch may be followed to block 725 and the system safely transitioned to an X0 sleep mode (system "off"). From there, the method 700 returns. If at decision block 710 it is determined, however, that a downlink data packet has arrived at the modem 101 for processing, the "yes" branch may be followed to subsequent decision block 715.

At decision block 715, the method 700 determines whether there is modem-associated memory capacity available for holding the data packet. If there is capacity available, the "yes" branch is followed to block 720 and the data packet is queued for future processing when the PCIe link 211 is reestablished. The method 700 returns and the modem 101 continues to wait for the AP 111 to establish the communications link. If, however, at decision block 715 it is determined that there is insufficient modem-associated memory capacity to hold the incoming data packet, the "no" branch is followed to block 730 and the data packet is dropped before the system is transitioned to X0 at block 725. In this way, the method 700 avoids overflow of data into the modem-associated memory while the modem 101 is unavailable for processing a workload due to no available PCIe link. And, advantageously, a crash of modem 101 may be avoided.

Figure 8:
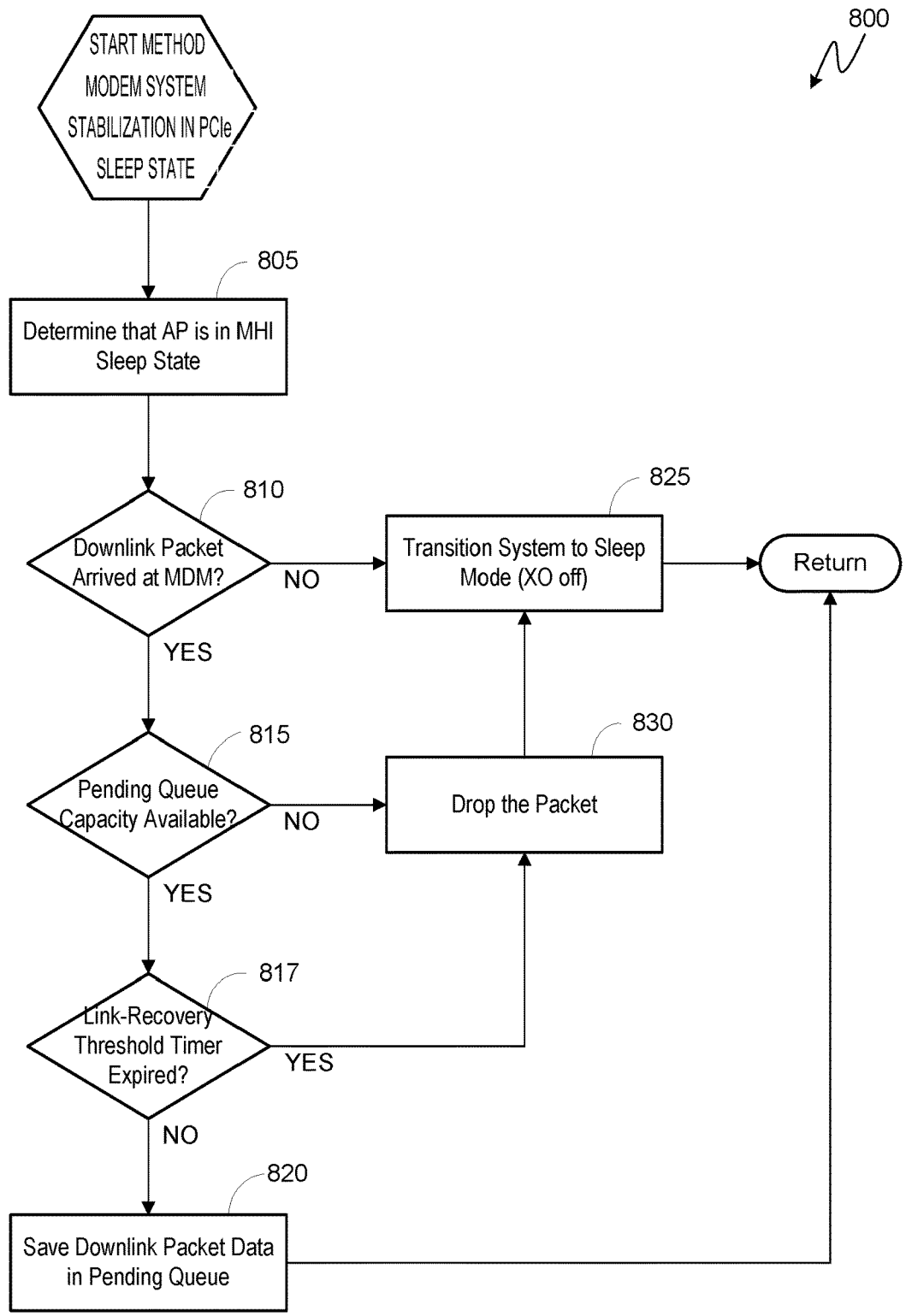
FIG. 8 is a flowchart illustrating a second exemplary method for modem stabilization in a SoC when waiting for an AP-driven PCIe communications link reestablishment.

FIG. 8 is a flowchart illustrating a second exemplary method 800 for modem stabilization in a SoC when waiting for an AP-driven PCIe communications link reestablishment. Beginning at block 805, the method 800 may determine that the AP 111 is in an MHI sleep state. The modem 101 may also be in a sleep state, such as a D3cold state. In such a situation, as previously described, data packets may be arriving at the modem 101 for processing, however, the modem 101 may not be available for processing unless and until the AP 111 transitions out of its present state and establishes (or, more likely, reestablishes) a PCIe communications link with modem 101. With a PCIe communications link 211 established, the modem 101 may transition out of the D3 state and into a D0 state for processing the workloads, per the PCIe protocol.

The method 800 continues to decision block 810. At decision block 810, the method 800 may determine whether a downlink data packet has arrived at modem 101 for processing. If no downlink data packet has arrived, the "no" branch may be followed to block 825 and the system safely transitioned to an X0 sleep mode (system "off"). From there, the method 800 returns. If at decision block 810 it is determined, however, that a downlink data packet has arrived at the modem 101 for processing, the "yes" branch may be followed to subsequent decision block 815.

At decision block 815, the method 800 determines whether there is modem-associated memory capacity available for holding the data packet. If, at decision block 815, it is determined that there is insufficient modem-associated memory capacity to hold the incoming data packet, the "no" branch is followed to block 830 and the data packet is dropped before the system is transitioned to X0 at block 825. If, at decision block 815, there is capacity available, the "yes" branch is followed to decision block 817 and the method 800 determines whether a link-recovery threshold timer 217 has expired. If the timer has expired, the "yes" branch is followed to block 830 and the packet is dropped before the system is transitioned to X0 at block 825, even though pending queue capacity in the modem-associated memory is available. If the timer has not expired, however, then the method 800 follows the "no" branch from decision block 817 to block 820. At block 820, the data packet is queued for future processing when the PCIe link 211 is reestablished. The method 800 returns and the modem 101 continues to wait for the AP 111 to establish the communications link. In this way, the method 800 avoids overflow of data into the modem-associated memory while the modem 101 is unavailable for processing a workload due to no available PCIe link. And, advantageously, a crash of modem 101 may be avoided.

Figure 9:
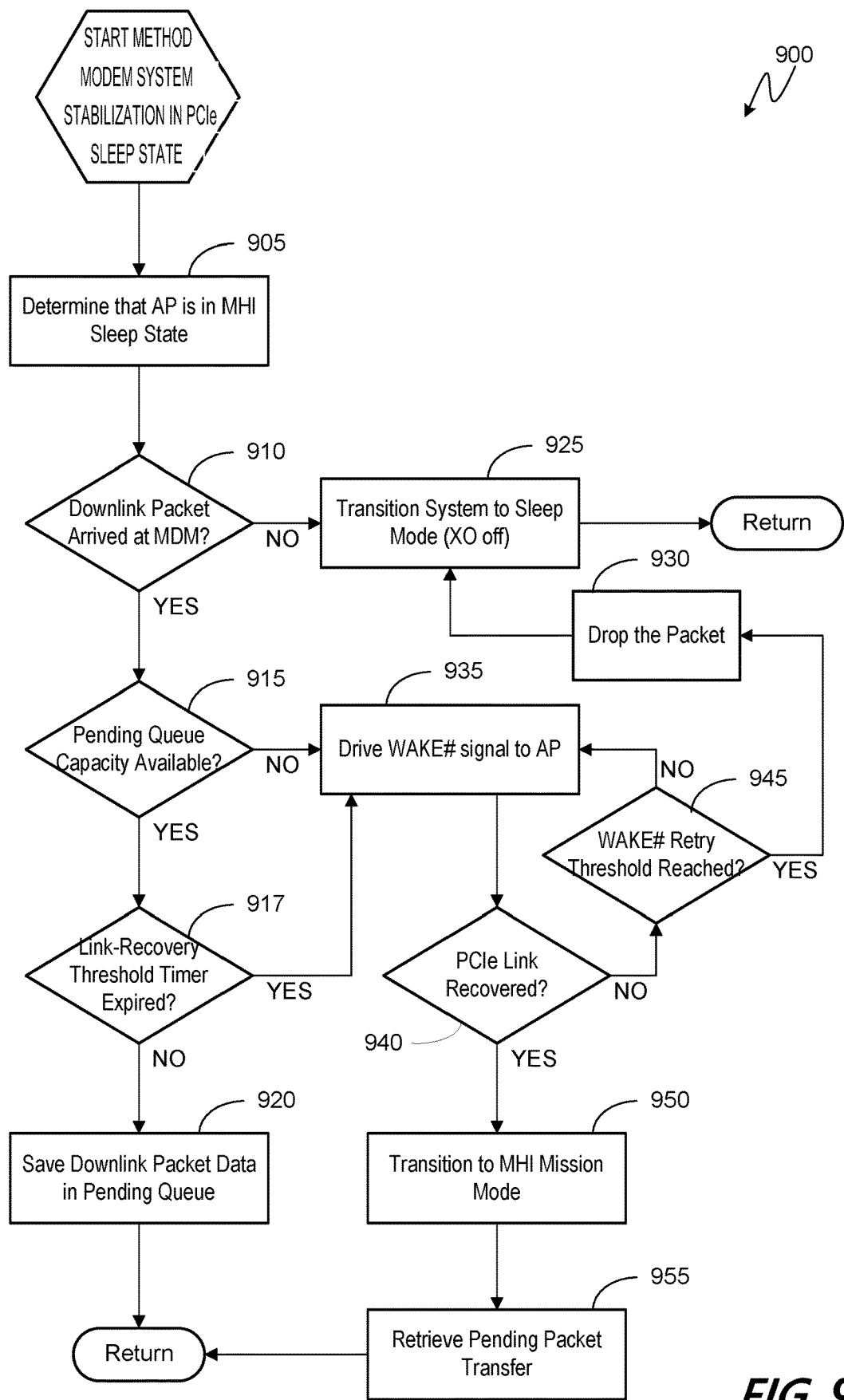
FIG. 9 is a flowchart illustrating a third exemplary method for modem stabilization in a SoC when waiting for an AP-driven PCIe communications link reestablishment.

FIG. 9 is a flowchart illustrating a third exemplary method 900 for modem stabilization in a SoC when waiting for an AP-driven PCIe communications link reestablishment. Beginning at block 905, the method 900 may determine that the AP 111 is in an MHI sleep state. The modem 101 may also be in a sleep state, such as a D3cold state. In such a situation, as previously described, data packets may be arriving at the modem 101 for processing, however, the modem 101 may not be available for processing unless and until the AP 111 transitions out of its present state and establishes (or, more likely, reestablishes) a PCIe communications link with modem 101. With a PCIe communications link 211 established, the modem 101 may transition out of the D3 state and into a D0 state for processing the workloads, per the PCIe protocol.

The method 900 continues to decision block 910. At decision block 910, the method 900 may determine whether a downlink data packet has arrived at modem 101 for processing. If no downlink data packet has arrived, the "no" branch may be followed to block 925 and the system safely transitioned to an X0 sleep mode (system "off"). From there, the method 900 returns. If at decision block 910 it is determined, however, that a downlink data packet has arrived at the modem 101 for processing, the "yes" branch may be followed to subsequent decision block 915.

At decision block 915, the method 900 determines whether there is modem-associated memory capacity available for holding the data packet. If, at decision block 915, it is determined that there is insufficient modem-associated memory capacity to hold the incoming data packet, the "no" branch is followed to block 935 and a wake interrupt is driven to the AP 111. Next, at decision block 940 it is determined whether the PCIe communications link is reestablished. If the link is not reestablished, the "no" branch is followed to decision block 945 and a threshold counter establishing a maximum number of wakeup attempts (WAKE #signals) to the AP 111 is consulted. If the wakeup threshold counter indicates that the maximum allowed number of wakeup attempts has not been reached, the "no" branch is followed from decision block 945 back to block 935 where a next WAKE # is driven to the AP 111. The method 900 may continue to loop through blocks 935, 940 and 945 in this way until either the PCIe link is recovered or the wakeup threshold is reached.

If the wakeup threshold is reached at decision block 945, the "yes" branch is followed to block 930 and the data packet is dropped before the system is transitioned to X0 at block 925. Alternatively, if the PCIe link is reestablished by the AP 111 in response to a WAKE #signal driven to the AP 111, the "yes" branch is followed from decision block 940 to block 950 where the modem 101 is transitioned to a mission mode D0 for processing workloads. With the modem 101 in mission mode, the method 900 may move to block 955 to retrieve the data packet for processing.

Returning back to decision block 915, if there is pending queue capacity available in modem-associated memory, the method 900 may follow the "yes" branch to decision block 917. At decision block 917 the method 900 determines whether a link-recovery threshold timer 217 has expired. If the timer has expired, the "yes" branch is followed to block 935 and a WAKE # is driven to AP 111—the method 900 proceeds from block 935 as previously described. If, however, the timer has not expired, the method 900 may follow the "no" branch from decision block 917 to block 920. At block 920, the data packet is queued for future processing when the PCIe link 211 is reestablished. The method 900 returns and the modem 101 continues to wait for the AP 111 to establish the communications link. In these ways, the method 900 avoids overflow of data into the modem-associated memory while the modem 101 is unavailable for processing a workload due to no available PCIe link. And, advantageously, a crash of modem 101 may be avoided.

Figure 10:
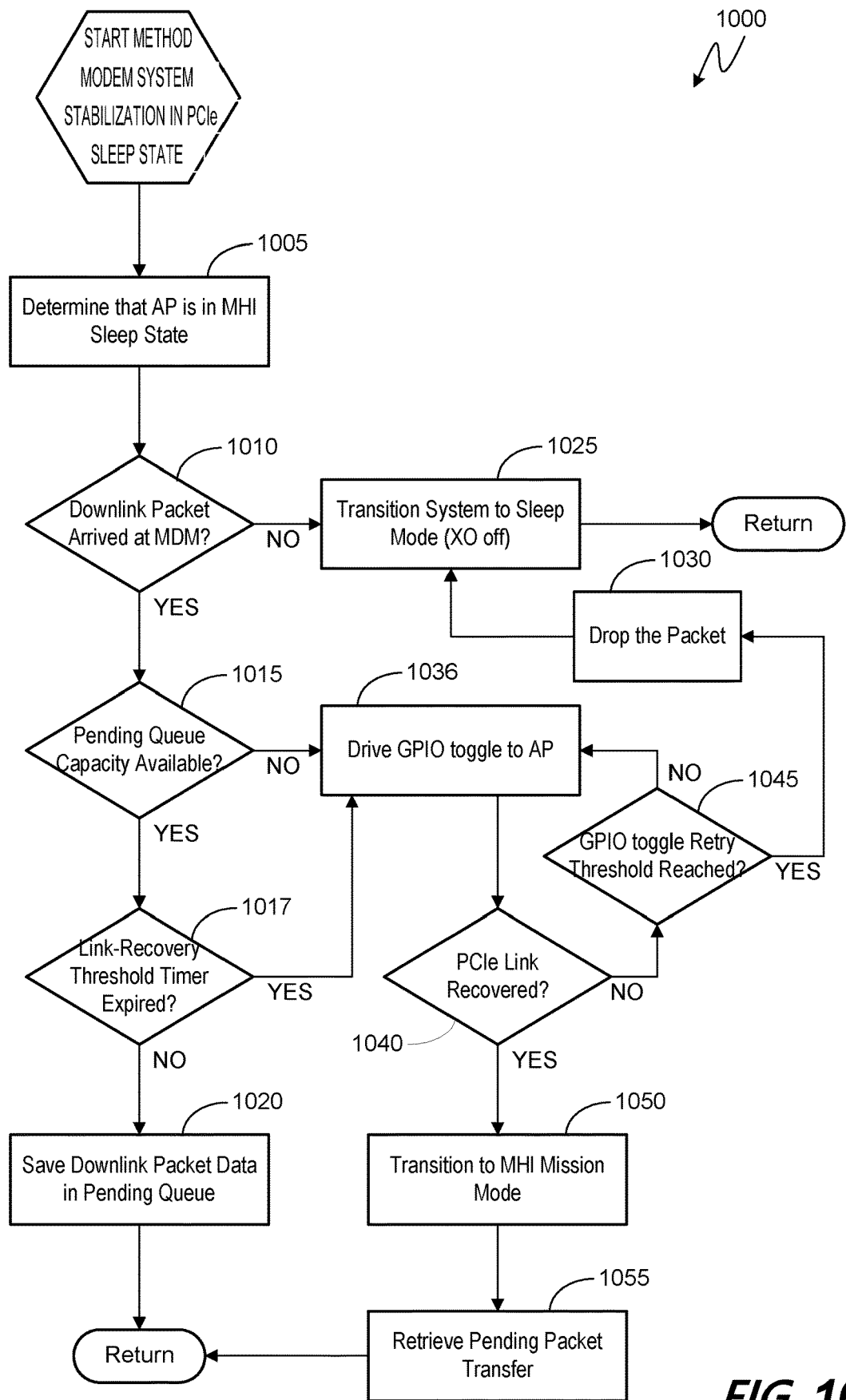
FIG. 10 is a flowchart illustrating a fourth exemplary method for modem stabilization in a SoC when waiting for an AP-driven PCIe communications link reestablishment.

FIG. 10 is a flowchart illustrating a fourth exemplary method 1000 for modem stabilization in a SoC when waiting for an AP-driven PCIe communications link reestablishment. Beginning at block 1005, the method 1000 may determine that the AP 111 is in an MHI sleep state. The modem 101 may also be in a sleep state, such as a D3cold state. In such a situation, as previously described, data packets may be arriving at the modem 101 for processing, however, the modem 101 may not be available for processing unless and until the AP 111 transitions out of its present state and establishes (or, more likely, reestablishes) a PCIe communications link with modem 101. With a PCIe communications link 211 established, the modem 101 may transition out of the D3 state and into a D0 state for processing the workloads, per the PCIe protocol.

The method 1000 continues to decision block 1010. At decision block 1010, the method 1000 may determine whether a downlink data packet has arrived at modem 101 for processing. If no downlink data packet has arrived, the "no" branch may be followed to block 1025 and the system safely transitioned to an X0 sleep mode (system "off"). From there, the method 1000 returns. If at decision block 1010 it is determined, however, that a downlink data packet has arrived at the modem 101 for processing, the "yes" branch may be followed to subsequent decision block 1015.

At decision block 1015, the method 1000 determines whether there is modem-associated memory capacity available for holding the data packet. If, at decision block 1015, it is determined that there is insufficient modem-associated memory capacity to hold the incoming data packet, the "no" branch is followed to block 1036 and a GPIO toggle is driven to the AP 111. Next, at decision block 1040 it is determined whether the PCIe communications link is reestablished. If the link is not reestablished, the "no" branch is followed to decision block 1045 and a threshold counter establishing a maximum number of GPIO toggle attempts to the AP 111 is consulted. If the toggle threshold counter indicates that the maximum allowed number of GPIO toggle attempts has not been reached, the "no" branch is followed from decision block 1045 back to block 1036 where a next GPIO toggle is driven to the AP 111. The method 1000 may continue to loop through blocks 1036, 1040 and 1045 in this way until either the PCIe link is recovered or the toggle threshold is reached.

If the GPIO toggle threshold is reached at decision block 1045, the "yes" branch is followed to block 1030 and the data packet is dropped before the system is transitioned to X0 at block 1025. Alternatively, if the PCIe link is reestablished by the AP 111 in response to a GPIO toggle driven to the AP 111, the "yes" branch is followed from decision block 1040 to block 1050 where the modem 101 is transitioned to a mission mode D0 for processing workloads. With the modem 101 in mission mode, the method 1000 may move to block 1055 to retrieve the data packet for processing.

Returning back to decision block 1015, if there is pending queue capacity available in modem-associated memory, the method 1000 may follow the "yes" branch to decision block 1017. At decision block 1017 the method 1000 determines whether a link-recovery threshold timer 217 has expired. If the timer has expired, the "yes" branch is followed to block 1036 and a GPIO toggle is driven to AP 111—the method 1000 proceeds from block 1036 as previously described. If, however, the timer has not expired, the method 1000 may follow the "no" branch from decision block 1017 to block 1020. At block 1020, the data packet is queued for future processing when the PCIe link 211 is reestablished. The method 1000 returns and the modem 101 continues to wait for the AP 111 to establish the communications link. In these ways, the method 1000 avoids overflow of data into the modem-associated memory while the modem 101 is unavailable for processing a workload due to no available PCIe link. And, advantageously, a crash of modem 101 may be avoided.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise random-access memory ("RAM"), read-only memory ("ROM"), EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Implementation examples are described in the following numbered clauses:

Clause 1. A method for modem stabilization in a SoC of a portable computing device ("PCD") when waiting for an application processor ("AP") to reestablish a PCIe communications link, the method comprising:
determining that the AP is in a sleep state, wherein the AP and a modem are operable to communicate over a PCIe channel;
determining that no active link is available over the PCIe channel;
recognizing that a data packet is available in a workload queue for processing by the modem; and
determining an available queue capacity in a memory component associated with the modem, wherein:
if the available queue capacity is adequate to store the data packet, storing the data packet in the available queue capacity for later processing; and
if the available queue capacity is inadequate to store the data packet, dropping the data packet from the workload queue.

2. The method of modem stabilization of clause 1, further comprising transitioning the SoC to a low-power state after dropping the data packet from the workload queue.

3. The method for modem stabilization of clause 1, further comprising:
monitoring a PCIe link recovery timer, wherein if the available queue capacity is adequate to store the data packet:
the data packet is dropped from the workload queue if the timer has exceeded a predefined threshold; and
the data packet is stored in the available queue capacity for later processing if the timer has not exceeded the predefined threshold.

4. The method for modem stabilization of clause 1, further comprising:
if the available queue capacity is inadequate to store the data packet, driving one of a WAKE #signal and a GPIO toggle from the modem to the AP before dropping the data packet from the workload queue, wherein if the WAKE #signal or GPIO toggle causes reestablishment of a link over the PCIe channel, transitioning the modem to an active processing state and processing the data packet.

5. The method for modem stabilization of clause 4, further comprising driving either multiple WAKE #signals or multiple GPIO toggles from the modem to the AP before dropping the data packet from the workload queue.

6. The method for modem stabilization of clause 3, further comprising:
if the available queue capacity is adequate to store the data packet, and the timer has exceeded the predefined threshold, driving one of a WAKE #signal or a GPIO toggle from the modem to the AP before the data packet is dropped from the workload queue, wherein if the WAKE #signal or the GPIO toggle causes reestablishment of a link over the PCIe channel, transitioning the modem to an active processing state and processing the data packet.

7. The method for modem stabilization of clause 6, further comprising driving either multiple WAKE #signals or multiple GPIO toggles from the modem to the AP before dropping the data packet from the workload queue.

8. The method for modem stabilization of clause 1, wherein the PCD is in the form of a wireless mobile phone.

Clause 9. A system for modem stabilization in a SoC of a portable computing device ("PCD") when waiting for an application processor ("AP") to reestablish a PCIe communications link, the method comprising:
means for determining that the AP is in a sleep state, wherein the AP and a modem are operable to communicate over a PCIe channel;
means for determining that no active link is available over the PCIe channel;
means for recognizing that a data packet is available in a workload queue for processing by the modem; and
means for determining an available queue capacity in a memory component associated with the modem, wherein:
if the available queue capacity is adequate to store the data packet, means for storing the data packet in the available queue capacity for later processing; and
if the available queue capacity is inadequate to store the data packet, means for dropping the data packet from the workload queue.

10. The system of modem stabilization of clause 9, further comprising means for transitioning the SoC to a low-power state after dropping the data packet from the workload queue.

11. The system for modem stabilization of clause 9, further comprising:
means for monitoring a PCIe link recovery timer, wherein if the available queue capacity is adequate to store the data packet:
the data packet is dropped from the workload queue if the timer has exceeded a predefined threshold; and
the data packet is stored in the available queue capacity for later processing if the timer has not exceeded the predefined threshold.

12. The system for modem stabilization of clause 9, further comprising:
if the available queue capacity is inadequate to store the data packet, means for driving one of a WAKE #signal and a GPIO toggle from the modem to the AP before dropping the data packet from the workload queue, wherein if the WAKE #signal or GPIO toggle causes reestablishment of a link over the PCIe channel, means for transitioning the modem to an active processing state and processing the data packet.

13. The system for modem stabilization of clause 12, further comprising means for driving either multiple WAKE #signals or multiple GPIO toggles from the modem to the AP before dropping the data packet from the workload queue.

14. The system for modem stabilization of clause 11, further comprising:
if the available queue capacity is adequate to store the data packet, and the timer has exceeded the predefined threshold, means for driving one of a WAKE #signal or a GPIO toggle from the modem to the AP before the data packet is dropped from the workload queue, wherein if the WAKE #signal or the GPIO toggle causes reestablishment of a link over the PCIe channel, means for transitioning the modem to an active processing state and processing the data packet.

15. The system for modem stabilization of clause 14, further comprising means for driving either multiple WAKE signals or multiple GPIO toggles from the modem to the AP before dropping the data packet from the workload queue.

16. The system for modem stabilization of clause 9, wherein the PCD is in the form of a wireless mobile phone.

Clause 17. A system for modem stabilization in a SoC of a portable computing device ("PCD") when waiting for an application processor ("AP") to reestablish a PCIe communications link, the system comprising:
 a modem and an AP communicatively connected by a PCIe channel, the modem configured to:
determine that the AP is in a sleep state;
 determine that no active link is available over the PCIe channel;
 recognize that a data packet is available in a workload queue for processing by the modem; and
determine an available queue capacity in a memory component associated with the modem, wherein:
if the available queue capacity is adequate to store the data packet, store the data packet in the available queue capacity for later processing; and
if the available queue capacity is inadequate to store the data packet, drop the data packet from the workload queue.

18. The system of modem stabilization of clause 17, wherein the modem is further configured to transition the SoC to a low-power state after dropping the data packet from the workload queue.

19. The system for modem stabilization of clause 17, wherein the modem is further configured to:
 monitor a PCIe link recovery timer, wherein if the available queue capacity is adequate to store the data packet:
the data packet is dropped from the workload queue if the timer has exceeded a predefined threshold; and
the data packet is stored in the available queue capacity for later processing if the timer has not exceeded the predefined threshold.

20. The system for modem stabilization of clause 17, wherein the modem is further configured to:
 if the available queue capacity is inadequate to store the data packet, drive one of a WAKE #signal and a GPIO toggle to the AP before dropping the data packet from the workload queue, wherein if the WAKE #signal or GPIO toggle causes reestablishment of a link over the PCIe channel, transition to an active processing state and processes the data packet.

21. The system for modem stabilization of clause 20, wherein the modem is further configured to drive either multiple WAKE #signals or multiple GPIO toggles to the AP before dropping the data packet from the workload queue.

22. The system for modem stabilization of clause 19, wherein the modem is further configured to:
 if the available queue capacity is adequate to store the data packet, and the timer has exceeded the predefined threshold, drive one of a WAKE #signal or a GPIO toggle to the AP before the data packet is dropped from the workload queue, wherein if the WAKE #signal or the GPIO toggle causes reestablishment of a link over the PCIe channel, transition to an active processing state and process the data packet.

23. The system for modem stabilization of clause 22, wherein the modem is further configured to drive either multiple WAKE #signals or multiple GPIO toggles to the AP before dropping the data packet from the workload queue.

Clause 24. A computer program product comprising a computer usable medium having a computer readable program code embodied therein, said computer readable program code adapted to be executed to implement a method for modem stabilization in a SoC of a portable computing device ("PCD") when waiting for an application processor ("AP") to reestablish a PCIe communications link, the method comprising:
 determining that the AP is in a sleep state, wherein the AP and a modem are operable to communicate over a PCIe channel;
 determining that no active link is available over the PCIe channel;
 recognizing that a data packet is available in a workload queue for processing by the modem; and
 determining an available queue capacity in a memory component associated with the modem, wherein:
 if the available queue capacity is adequate to store the data packet, storing the data packet in the available queue capacity for later processing; and
 if the available queue capacity is inadequate to store the data packet, dropping the data packet from the workload queue.

25. The computer program product of clause 24, further comprising transitioning the SoC to a low-power state after dropping the data packet from the workload queue.

26. The method for modem stabilization of clause 24, further comprising:
 monitoring a PCIe link recovery timer, wherein if the available queue capacity is adequate to store the data packet:
the data packet is dropped from the workload queue if the timer has exceeded a predefined threshold; and
the data packet is stored in the available queue capacity for later processing if the timer has not exceeded the predefined threshold.

27. The computer program product of clause 24, further comprising:
 if the available queue capacity is inadequate to store the data packet, driving one of a WAKE #signal and a GPIO toggle from the modem to the AP before dropping the data packet from the workload queue, wherein if the WAKE #signal or GPIO toggle causes reestablishment of a link over the PCIe channel, transitioning the modem to an active processing state and processing the data packet.

28. The computer program product of clause 27, further comprising driving either multiple WAKE #signals or multiple GPIO toggles from the modem to the AP before dropping the data packet from the workload queue.

29. The computer program product of clause 26, further comprising:
 if the available queue capacity is adequate to store the data packet, and the timer has exceeded the predefined threshold, driving one of a WAKE #signal or a GPIO toggle from the modem to the AP before the data packet is dropped from the workload queue, wherein if the WAKE #signal or the GPIO toggle causes reestablishment of a link over the PCIe channel, transitioning the modem to an active processing state and processing the data packet.

30. The computer program product of clause 29, further comprising driving either multiple WAKE #signals or multiple GPIO toggles from the modem to the AP before dropping the data packet from the workload queue.

Therefore, although selected aspects have been illustrated and described in detail, it will be understood that various substitutions and alterations may be made therein without departing from the spirit and scope of the present invention, as defined by the following claims.

What is claimed is:

1. A method for modem stabilization, the method comprising:

determining that an application processor (AP) is in a sleep state, wherein the AP and a modem are operable to communicate over a peripheral component interconnect express (PCIe) channel;

determining that no active link is available over the PCIe channel;

recognizing that a data packet is available in a workload queue for processing by a modem; and determining an available queue capacity in a memory component associated with the modem, wherein:

if the available queue capacity is adequate to store the data packet, storing the data packet in the available queue capacity for later processing; and if the available queue capacity is inadequate to store the data packet, driving either multiple WAKE #signals or multiple GPIO toggles from the modem to the AP before dropping the data packet from the workload queue, wherein if a WAKE #signal or a GPIO toggle causes reestablishment of a link over the PCIe channel, transitioning the modem to an active processing state and processing the data packet and, if the link is not established, then dropping the data packet.

2. The method of modem stabilization of claim 1, further comprising transitioning a system on chip (SoC) with the AP to a low-power state after dropping the data packet from the workload queue.

3. The method for modem stabilization of claim 1, further comprising:

monitoring a PCIe link recovery timer, wherein if the available queue capacity is adequate to store the data packet:

the data packet is dropped from the workload queue if the timer has exceeded a predefined threshold; and the data packet is stored in the available queue capacity for later processing if the timer has not exceeded the predefined threshold.

4. The method for modem stabilization of claim 3, further comprising:

if the available queue capacity is adequate to store the data packet, and the timer has exceeded the predefined threshold, driving one of a WAKE #signal or a GPIO toggle from the modem to the AP before the data packet is dropped from the workload queue, wherein if the WAKE #signal or the GPIO toggle causes reestablishment of a link over the PCIe channel, transitioning the modem to an active processing state and processing the data packet.

5. The method for modem stabilization of claim 1, wherein a PCD housing the AP is in the form of a wireless mobile phone.

6. A system for modem stabilization of a portable computing device ("PCD"), the system comprising:

means for determining that an application processor (AP) is in a sleep state, wherein the AP and a modem are operable to communicate over a peripheral component interconnect express (PCIe) channel;

means for determining that no active link is available over the PCIe channel;

means for recognizing that a data packet is available in a workload queue for processing by a modem; and means for determining an available queue capacity in a memory component associated with the modem, wherein:

if the available queue capacity is adequate to store the data packet, activating means for storing the data packet in the available queue capacity for later processing; and if the available queue capacity is inadequate to store the data packet, activating means for driving either multiple WAKE #signals or multiple GPIO toggles from the modem to the AP before activating means for dropping the data packet from the workload queue, wherein if a WAKE #signal or a GPIO toggle causes reestablishment of a link over the PCIe channel, then activating means for transitioning the modem to an active processing state and processing the data packet and, if the link is not established, then dropping the data packet.

7. The system of modem stabilization of claim 6, further comprising means for transitioning a system on chip (SoC) containing the AP to a low-power state after dropping the data packet from the workload queue.

8. The system for modem stabilization of claim 6, further comprising:

means for monitoring a PCIe link recovery timer, wherein if the available queue capacity is adequate to store the data packet:

the data packet is dropped from the workload queue if the timer has exceeded a predefined threshold; and the data packet is stored in the available queue capacity for later processing if the timer has not exceeded the predefined threshold.

9. The system for modem stabilization of claim 8, further comprising:

if the available queue capacity is adequate to store the data packet, and the timer has exceeded the predefined threshold, activating means for driving one of a WAKE #signal or a GPIO toggle from the modem to the AP before the data packet is dropped from the workload queue, wherein if the WAKE #signal or the GPIO toggle causes reestablishment of a link over the PCIe channel, then activating means for transitioning the modem to an active processing state and processing the data packet.

10. The system for modem stabilization of claim 6, wherein the PCD is in the form of a wireless mobile phone.

11. A system for modem stabilization of a portable computing device ("PCD") comprising:

a modem and an application processor (AP) communicatively connected by a peripheral component interconnect express (PCIe) channel, the modem configured to:

determine that the AP is in a sleep state;

determine that no active link is available over the PCIe channel;

recognize that a data packet is available in a workload queue for processing by the modem; and determine an available queue capacity in a memory component associated with the modem, wherein:

if the available queue capacity is adequate to store the data packet, store the data packet in the available queue capacity for later processing; and if the available queue capacity is inadequate to store the data packet, drive either multiple WAKE #signals or GPIO toggles to the AP before dropping the data packet from the workload queue, wherein if a WAKE #signal or a GPIO toggle causes reestablishment of a link over the PCIe channel, transition to an active processing state and process the data packet and, if the link is not established, then drop the data packet.

12. The system of modem stabilization of claim 11, wherein the modem is further configured to transition a system on chip (SoC) containing the AP to a low-power state after dropping the data packet from the workload queue.

13. The system for modem stabilization of claim 11, wherein the modem is further configured to:
monitor a PCIe link recovery timer, wherein if the available queue capacity is adequate to store the data packet:
the data packet is dropped from the workload queue if the timer has exceeded a predefined threshold; and
the data packet is stored in the available queue capacity for later processing if the timer has not exceeded the predefined threshold.

14. The system for modem stabilization of claim 13, wherein the modem is further configured to:
if the available queue capacity is adequate to store the data packet, and the timer has exceeded the predefined threshold, drive one of a WAKE #signal or a GPIO toggle to the AP before the data packet is dropped from the workload queue, wherein if the WAKE #signal or the GPIO toggle causes reestablishment of a link over the PCIe channel, transition to an active processing state and process the data packet.

15. A computer program product comprising a non-transitory computer usable medium having a computer readable program code embodied therein, said computer readable program code adapted to be executed to implement a method for modem stabilization, the method comprising:
determining that an application processor (AP) is in a sleep state, wherein the AP and a modem are operable to communicate over a peripheral component interconnect express (PCIe) channel;
determining that no active link is available over the PCIe channel;
recognizing that a data packet is available in a workload queue for processing by the modem; and
determining an available queue capacity in a memory component associated with the modem, wherein:
if the available queue capacity is adequate to store the data packet, storing the data packet in the available queue capacity for later processing; and
if the available queue capacity is inadequate to store the data packet, driving either multiple WAKE #signals or multiple GPIO toggles from the modem to the AP before dropping the data packet from the workload queue, wherein if a WAKE #signal or a GPIO toggle causes reestablishment of a link over the PCIe channel, transitioning the modem to an active processing state and processing the data packet and, if the link is not established, then dropping the data packet.

16. The computer program product of claim 15, further comprising transitioning a system on chip (SoC) containing the AP to a low-power state after dropping the data packet from the workload queue.

17. The computer program product of claim 15, further comprising:
monitoring a PCIe link recovery timer, wherein if the available queue capacity is adequate to store the data packet:
the data packet is dropped from the workload queue if the timer has exceeded a predefined threshold; and
the data packet is stored in the available queue capacity for later processing if the timer has not exceeded the predefined threshold.

18. The computer program product of claim 17, further comprising:
if the available queue capacity is adequate to store the data packet, and the timer has exceeded the predefined threshold, driving one of a WAKE #signal or a GPIO toggle from the modem to the AP before the data packet is dropped from the workload queue, wherein if the WAKE #signal or the GPIO toggle causes reestablishment of a link over the PCIe channel, transitioning the modem to an active processing state and processing the data packet.

* * * * *